United States Patent [19]

Carnahan

[11] Patent Number: 5,414,780
[45] Date of Patent: May 9, 1995

[54] METHOD AND APPARATUS FOR IMAGE DATA TRANSFORMATION

[75] Inventor: Shawn V. A. Carnahan, Nevada City, Calif.

[73] Assignee: ImMIX, Grass Valley, Calif.

[21] Appl. No.: 9,891

[22] Filed: Jan. 27, 1993

[51] Int. Cl.⁶ .................. G06K 9/36; G06K 9/46; H04N 7/12

[52] U.S. Cl. .................. 382/276; 382/232; 358/403

[58] Field of Search .................. 382/41, 49, 56; 364/487, 728.01, 133, 136; 358/261; 367/136; 73/602; 84/622; 381/48

[56] References Cited

U.S. PATENT DOCUMENTS

| | | | |
|---|---|---|---|
| 4,974,187 | 11/1990 | Lawton | 364/728.01 |
| 4,984,076 | 1/1991 | Watanabe et al. | 358/133 |
| 5,014,134 | 5/1991 | Lawton et al. | 358/261.3 |
| 5,214,507 | 5/1993 | Aravind et al. | 358/133 |
| 5,214,708 | 5/1993 | McEachern | 381/48 |
| 5,241,383 | 8/1993 | Chen et al. | 358/136 |
| 5,245,589 | 9/1993 | Abel et al. | 367/136 |
| 5,248,845 | 9/1993 | Massie et al. | 84/622 |
| 5,253,530 | 10/1993 | Letcher, III | 73/602 |
| 5,262,958 | 11/1993 | Chui et al. | 364/487 |

FOREIGN PATENT DOCUMENTS

WO91/02318  2/1991  WIPO.

OTHER PUBLICATIONS

Parhi "Video Data Format Converters Using Minimum Number of Registers" IEEE CSUT, vol. 2, No. 2. Jun. 1992, pp. 255–267.

Primary Examiner—Joseph Mancuso
Assistant Examiner—David Fox
Attorney, Agent, or Firm—Limbach & Limbach

[57] ABSTRACT

A method and apparatus for transforming image data by recursively interleaving the data to generate blocks of component image coefficients having form suitable for subsequent quantization, motion estimation, and/or coding. In preferred embodiments, the transformed data are in optimal form for coding by conventional circuitry in accordance with the conventional JPEG or MPEG compression algorithm. In preferred embodiments, the invention includes two memory arrays (each having capacity to store one or more N×M image data blocks), and an analyzer connected between the memory arrays. The analyzer receives horizontal vectors (such as full rows) of an image data block stored in the first memory, transforms each horizontal vector into two vectors (each comprising half as many words as the horizontal vector), interleaves the two vectors, and writes the resulting interleaved data (an orthogonal representation of the horizontal vector) into a row of the second memory. The analyzer then sequentially receives vertical vectors (such as columns) of an image data block stored in the second memory, converts each vertical vector into two vectors (each comprising half as many words as the vertical vector), interleaves the vectors, and writes the resulting interleaved data into a column of the first memory. Typically, multiple iterations are performed. After each iteration, the first memory contains a set of interleaved component image blocks. Preferably, the analyzer is a wavelet transform module including a pair of conjugate mirror filters and an interleaving circuit.

30 Claims, 4 Drawing Sheets (PRIOR ART)

METHOD AND APPARATUS FOR IMAGE DATA TRANSFORMATION

FIELD OF THE INVENTION

The present invention relates to methods and apparatus for transforming image data (such as video data) for subsequent quantization, motion estimation, and/or coding. More particularly, the invention pertains to recursive interleaving of image data to generate blocks of component image coefficients having form suitable for subsequent quantization, motion estimation, and/or coding.

BACKGROUND OF THE INVENTION

Most image sensors and displays generate or accept image signals in color raster scan format, in which pixels comprising a first horizontal line are generated or displayed sequentially (from left to right), and pixels comprising the next line are then generated or displayed sequentially (from left to right), and so on. In many conventional color image display devices, each pixel is driven by a set of three analog color component signals (a red, a green, and a blue color component signal). Typically, each analog color component signal is generated by processing a multi-bit digital data word in a digital-to-analog conversion circuit.

If a set of analog or digital image data in color raster scan format represents a monochrome image, the data are said to be in "line-scan" format. If a set of analog or digital data in color raster scan format represents a color image, the individual color component signals are typically interleaved.

It is well known to perform image compression on digital image data to generate a reduced set of (compressed) data from which the original image can be reconstructed without loss of essential features. The compressed data can be transmitted (or stored) more efficiently than can the original image data. An inverse (decompression) transformation can be applied to the transmitted data (or the data read out from storage) to recover the original image (or a reasonable facsimile thereof).

Throughout this specification, including in the claims, "block" denotes an array of N×M samples of a given color component (N and M are integers), "word" denotes a color component sample (e.g., an analog red, green, or blue sample of an analog image representation, or an eight-bit digital word defining a red, green, or blue sample of an analog image representation), and "line length" denotes the number of words per line of an image signal (for the color component having the highest horizontal resolution, in the case of color image data in which the different color components have different resolution).

Most image compression algorithms do not process image data in line-scan format, and instead process image data in N'×M' block format. For example, the conventional image compression algorithms known as the ISO "JPEG" algorithm (for still images) and the ISO "MPEG" algorithm (for video signal compression) both process image data in 8×8 block format (M'=N =8). Examples of such input data include: a repeating sequence of an 8×8 block of red words, followed by an 8×8 block of green words, followed by an 8×8 block of blue words (image processors for processing "RGB(1:1:1)" images will expect the input data to have this format); and a repeating sequence of two 8×8 blocks of Y words, followed by an 8×8 block of U words, followed by an 8×8 block of V words (image processors for processing "YUV(2:1:1)" images will expect the input data to have this format).

Typical algorithms for performing image compression on digital image data include two steps: a transformation step which generates transformed image data (in which the correlation between adjacent pixels is reduced relative to that existing in the input image data); followed by a quantization step which replaces each pixel of the transformed image data with a quantized pixel comprising fewer bits (on the average). To reduce loss of information during the quantization step, it has been proposed to design the transformation step so that the transformed image data is a set of component image signals having different spatial frequencies (so that the transformed image data is a "pyramidal" or "multiresolution" representation of the image).

For example, U.S. Pat. No. 5,014,134, issued May 7, 1991, discloses a method and apparatus for performing image compression in which image data are transformed into a pyramidal image representation. The apparatus of U.S. Pat. No. 5,014,134 includes a first transformation circuit ("analyzer") which converts each row of an M×M block of input image data into two vectors, $y_L$ and $y_H$, each comprising M/2 words. Vectors $y_L$ define an M row×M/2 column component image representation L (representing relatively low spatial frequency information), and vectors $y_H$ define an M×M/2 component image representation H (representing relatively high spatial frequency information). The apparatus of U.S. Pat. No. 5,014,134 includes two additional analyzers. One of the additional analyzers (the "second" analyzer) receives a sequence of column vectors of image L and converts each such column vector into two column vectors $y_{LL}$ and $y_{LH}$ (each comprising M/2 words). The other of the additional analyzers (the "third" analyzer) receives a sequence of column vectors of image H and converts each such column vector into two column vectors $y_{HL}$ and $y_{HH}$ (each comprising M/2 words). The outputs of the second analyzer determine two M/2×M/2 component images (LL and LH), and the outputs of the third analyzer determine two M/2×M/2 component images (HL and HH). Image LL represents the lowest spatial frequency information of the original image, and images LH, HL, and HH represent higher spatial frequency information of the original image. Component images LL, LH, HL, and HH (each of which is a M/2×M/2 image data block, and which together define a pyramidal representation of the original image) are then separately quantized and coded to generate compressed image data representing a compressed version of the original image.

Figure 1:
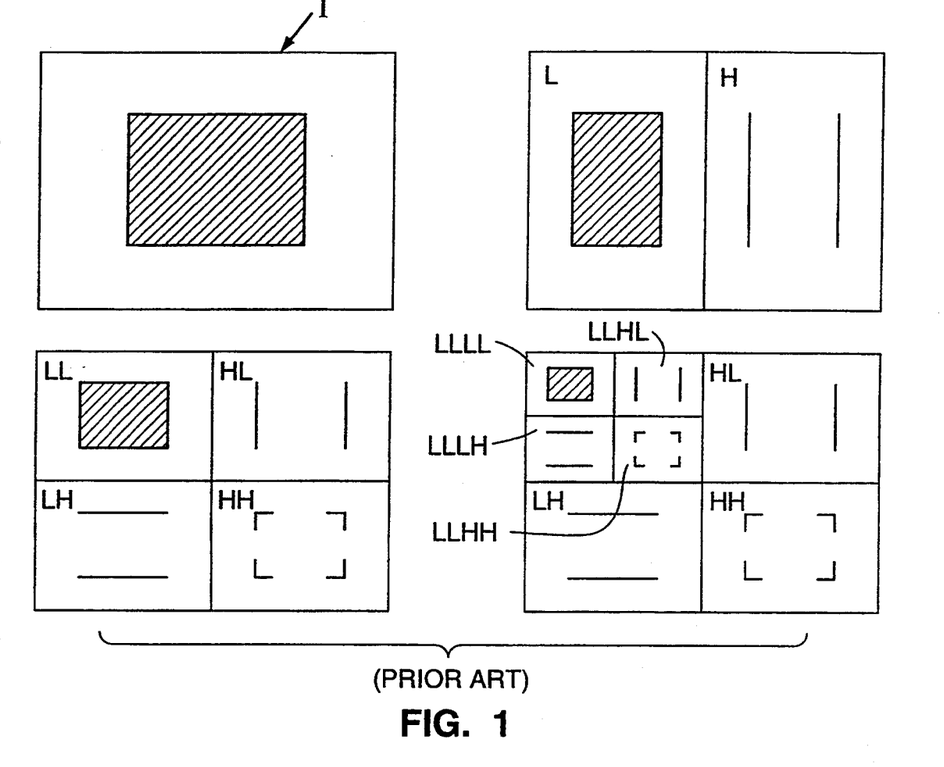
FIG. 1 is a diagram representing a conventional transformation of an image signal into a set of component image signals having different spatial frequencies, known as a "pyramidal" representation.

The upper left image representation, I, in FIG. 1 represents the original image, the upper right image representation in FIG. 1 represents component images L and H, and the lower left image representation in FIG. 1 represents component images LL, LH, HL, and HH (which together define a pyramidal representation of the original image).

The apparatus of U.S. Pat. No. 5,014,134 also discloses means for reconstructing the original image, which generates one M×M block of reconstructed image data from the compressed image data. The reconstruction means includes a dequantizer and decoder for reconstructing the M/2×M/2 component image representations LL, LH, HL, and HH from the compressed image data, and three transformation circuits ("synthesizers"). The first synthesizer transforms the reconstructed (decompressed) HH and HL component images into a reconstructed image representation H (an $M \times M/2$ component image representation). The second synthesizer transforms the reconstructed (decompressed) LH and LL component images into a reconstructed image representation L (also an $M \times M/2$ component image representation). The third synthesizer receives the reconstructed image representations L and H, and transforms them into a reconstructed image representation (an $M \times M$ representation of the original image).

U.S. Pat. No. 5,014,134 also teaches an iterative pyramidal representation generation process, in which each iteration consists of transforming the component image representation having the lowest spatial frequency (the LL component image representation) generated during previous iteration. The lower right image representation of FIG. 1 represents the result of performing a second iteration of this type on the lower left image representation of FIG. 1. Specifically, the lower right image in FIG. 1 represents component images LLLL, LLHL, LLLH, LLHH, LH, HL, and HH (which together define a pyramidal representation of the original image, with component images LLLL, LLHL, LLLH, LLHH together defining a pyramidal representation of component image LL generated during the first iteration).

However, the methods and apparatus disclosed in U.S. Pat. No. 5,014,134 for transforming image data into pyramidal representations do not result in pyramidal representations optimal for subsequent quantization and coding (particularly for coding in accordance with the conventional ISO "JPEG" or "MPEG" image compression algorithm).

SUMMARY OF THE INVENTION

The invention is a method and apparatus for transforming image data by recursively interleaving the image data to generate blocks of component image coefficients having form suitable for subsequent quantization, motion estimation, and/or coding. In preferred embodiments, the transformed data generated in accordance with the invention are in optimal form for subsequent coding in accordance with the conventional ISO "JPEG" or "MPEG" image compression algorithm.

In a class of preferred embodiments, the apparatus of the invention includes two memory arrays (each having sufficient capacity to store one or more blocks of $N \times M$ image data words), a first analyzer circuit connected between the memory arrays, and a second analyzer circuit connected between the memory arrays. M and N are integers. Typically, each of M and N is divisible by $2^k$, where k is the number of recursive decomposition levels of the implemented transformation.

The first analyzer sequentially receives horizontal vectors (such as full rows) of an $N \times M$ image data block stored in the first memory, transforms each horizontal vector into two vectors (each comprising half as many words as the horizontal vector), interleaves the two vectors, and writes the resulting interleaved data (an orthogonal representation of the horizontal vector) into a row of the second memory. The second analyzer sequentially receives vertical vectors (such as columns) of the image data stored in the second memory, converts each vertical vector into two vectors (each comprising half as many words as the vertical vector), interleaves the vectors, and writes the resulting interleaved data into a column of the first memory.

Typically, multiple iterations, each comprising transformation of data in the first memory by the first analyzer followed by further transformation of the data in the second memory by the second analyzer. After each iteration, the first memory contains a set of interleaved component image blocks.

More specifically, during the first iteration, the first analyzer converts each M-word row of the first memory into two vectors $\phi$ and $\psi$ (each comprising M/2 words or "coefficients"), interleaves the vectors $\phi$ and $\psi$ for each row, and writes the resulting interleaved vector into a row of the second memory. Each pair of vectors $\phi$ and $\psi$ together determines an orthogonal representation of the row processed by the first analyzer. Then (also during the first iteration), the second analyzer sequentially receives N-word columns of (partially transformed) data from the second memory, converts each column into two vectors, $\phi$ and $\psi$ (each comprising N/2 words), interleaves the vectors $\phi$ and $\psi$, and writes the resulting interleaved column vector into a column of the first memory.

During the second iteration, the first analyzer converts M/2-word horizontal vectors stored in the first memory into two vectors $\phi$ and $\psi$ (each comprising M/4 words), interleaves the vectors $\phi$ and $\psi$ for each row, and writes the resulting interleaved vector into a subset of the memory locations which comprise a row of the second memory. Then, the second analyzer sequentially receives N/2-word vertical vectors of data from the second memory, converts each vertical vector into two vectors $\phi$ and $\psi$ (each comprising N/4 words), interleaves the vectors $\phi$ and $\psi$, and writes the resulting interleaved vertical vector into a subset of the memory locations which comprise a column of the first memory.

Typically, multiple iterations are performed. If the first memory and the second memory each has an $M \times M$ array of storage locations, the content of the first memory at the end of the "k"th iteration is a set of interleaved component image blocks, which are a pyramidal representation of the original image arranged in a repeating pattern of $2^k \times 2^k$ blocks, each $2^k \times 2^k$ block consisting of interleaved words from different component image blocks (corresponding to different spatial frequencies). During the "k"th iteration, the first analyzer processes horizontal vectors each consisting of $M^{k-1}$ words and the second analyzer processes vertical vectors each consisting of $N^{k-1}$ words.

In preferred embodiments, each analyzer is a wavelet transform module including a pair of conjugate mirror filters and an interleaving circuit.

In other preferred embodiments, the apparatus of the invention includes a single analyzer (connected between first and second memories) and a control means for controlling the analyzer. The control means causes the analyzer to perform not only the operations performed by the first analyzer (in those embodiments of the invention which employ two analyzers) but also those performed by the second analyzer (in embodiments with two analyzers).

To increase the rate at which the inventive apparatus can process data (for example, to permit processing of video images in real time, i.e., at a rate of 60 fields per second), the apparatus includes two pairs of memories (each memory having capacity to store a field of data, where the field of data comprises an integral number of NXM data blocks), two quad port bus switches (one connected between each pair of memories), and an analyzer circuit connected between the switches. The switches are controlled so that, at any time, the analyzer reads and writes data between a first memory and a second memory to implement the inventive transformation on a N×M data block in the first memory, a previously transformed field of N×M data blocks is read out of a third memory, and a new field of N×M data blocks is written into the fourth memory.

BRIEF DESCRIPTION OF THE DRAWINGS

FIG/ 2 is a block diagram of a first preferred embodiment of the inventive apparatus.

DETAILED DESCRIPTION OF THE PREFERRED EMBODIMENTS

Figure 2:
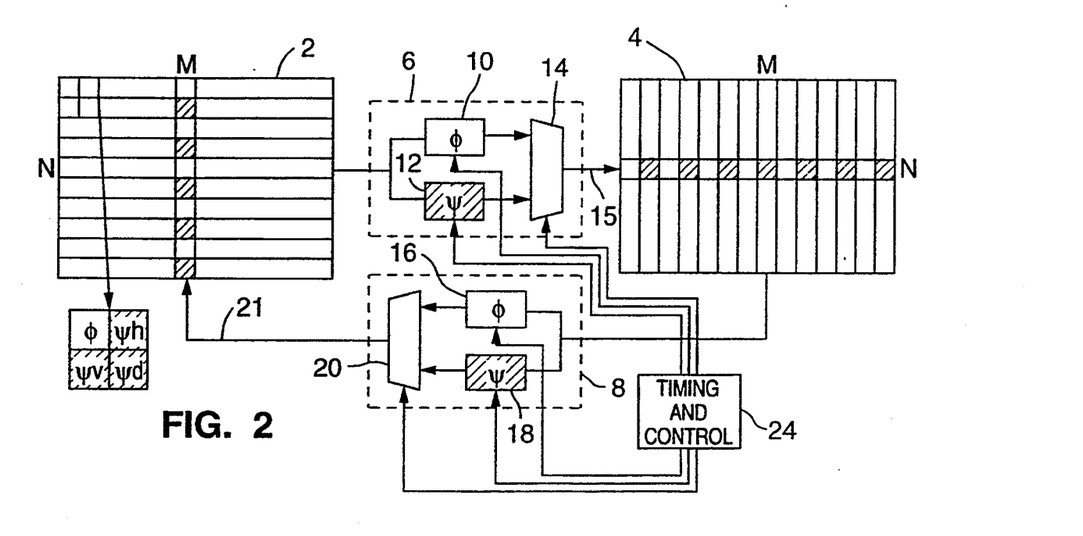

FIG. 2 is a block diagram of a preferred embodiment of the invention. This embodiment includes first memory array 2 and second memory array 4, each having sufficient capacity to store one or more blocks of N×M image data words (where M and N are integers), first analyzer circuit 6 connected between memory arrays 2 and 4, and second analyzer circuit 8 connected between memory arrays 2 and 4. Typically, the FIG. 2 apparatus processes binary data, and each of integers M and N is divisible by $2^k$, where k is the number of recursive decomposition levels of the implemented transformation (i.e., the number of iterations in which data are processed first in analyzer 6 and then in analyzer 8).

In operation, an N×M block of image data is initially stored in memory array 2. During the first iteration, analyzer 6 sequentially receives rows of the stored block and converts each row (comprising M words) into two vectors, $\phi$ and $\psi$ (each comprising M/2 words or "coefficients"). Analyzer 6 then interleaves the vector pair $\phi$ and $\psi$ for each row, and writes the resulting interleaved vector for each row (comprising M coefficients) into a row of memory array 4.

In the preferred embodiment of FIG. 2, analyzer 6 is a wavelet transform module which includes a pair of conjugate mirror filters (10 and 12) and an interleaving circuit 14. For each horizontal vector $x_i$ from memory 2 (which can be a full row defined by M'=M words $x_i$, where $0 \leq i \leq M-1$, or an M'-word subset of a row, where M'<M), filter 10 outputs vector $\phi_m$ having form $\phi_m = \Sigma\ a_k\ x_{2m+k}$, where k ranges from 0 through 2X−1, X is the order of the wavelet basis, $a_k$ are the coefficients of the wavelet basis, m is an integer in the range from 0 through (M'/2−1), and $x_{i+M'}$ is defined to equal $x_i$. Similarly, for each horizontal vector $x_i$ from memory 2, filter 12 outputs vector $\psi_m$ having form $\psi_m = \Sigma(-1)^k a_{2X-1-k}\ x_{2m+k}$, where k ranges from 0 through 2X−1, X is the order of the wavelet basis, $0 \leq m \leq M'/2-1$, and $x_{i+M'}$ is defined to equal $x_i$. Each pair of vectors $\phi$ and $\psi$ together determines an orthogonal representation of the horizontal vector processed by the first analyzer.

Interleaver 14 interleaves the words of each vector $\phi$ with the words of the corresponding vector $\psi$, to generate an interleaved, transformed horizontal vector 15 (comprising M' words). Each interleaved vector 15 is written into a different row of memory array 4. During the first iteration of a transformation, analyzer 6 typically processes full rows of data stored in memory 2 (each row comprising M'=M words), so that each transformed horizontal vector 15 comprises M words during the first iteration.

After analyzer 6 sequentially processes all necessary horizontal vectors $x_i$ from memory 2 (and causes the processed, interleaved data to be written into memory 4), analyzer 8 sequentially processes vertical vectors (which can be full columns defined by N'=N words $y_i$, where $0 \leq i \leq N-1$, or an N'-word subset of a column, where N'<N) of the transformed N×M block in memory 4.

Analyzer 8 sequentially receives vertical vectors of the N×M block in memory 4, converts each vertical vector (comprising N' words) into two vectors, $\phi$ and $\psi$ (each comprising N'/2 words), interleaves the vectors $\phi$ and $\psi$, and writes the resulting interleaved, transformed vertical vector into a column of memory 2.

In the preferred embodiment of FIG. 2, analyzer 8 is identical to analyzer 6, except that it is designed to process N'-word input vectors rather than M'-word vectors (however, in a preferred embodiment, M'=N'). Analyzer 8 is thus preferably a wavelet transform module which includes a pair of conjugate mirror filters (16 and 18) and an interleaving circuit 20. For each vertical vector from memory 4 (defined by N' words $y_i$, where $0 \leq i \leq N'-1$), filter 16 outputs vector $\phi_m$ having form $\phi_m = \Sigma\ a_k\ y_{2m+k}$, where k ranges from 0 through 2X−1, X is the order of the wavelet basis, $m=0 \leq m \leq N'/2-1$, and $y_{i+N'}$ is defined to equal $y_i$. Similarly, for each vertical vector $y_i$ from memory 4, filter 18 outputs vector $\psi_m$ having form $\psi_m = \Sigma\ (-1)^k a_{2X-1-k} x_{2m+k}$, where k ranges from 0 through 2X−1, X is the order of the wavelet basis, $0 \leq m \leq N'/2-1$, and $y_{i+N'}$ is defined to equal $y_i$. Vector $\phi$ (defined by N'/2 words) and vector $\psi$ (defined by N'/2 words) together determine an orthogonal representation of vertical vector $y_i$ from memory 4.

Interleaver 20 interleaves the words of each vector $\phi$ with the words of the corresponding vector $\psi$, to generate an interleaved vertical vector 21 (comprising N' words). Each interleaved vector 21 is written into a different column of memory array 2.

Timing and control circuitry 24 supplies timing and control signals to filters 10, 12, 16, and 18, and interleaving circuits 14 and 20, to control their operation to cause them to implement the inventive method described herein. Typically, circuitry 24 includes two transform address generators (such as address generators 87 and 88 of FIG. 7) each of which provides appropriate addresses for writing vectors of data from one of the memories to one of the analyzers (or for reading interleaved vectors from one of the analyzers to one of the memories), and a transform sequence controller (such as controller 89 of FIG. 7) for controlling the transform address generators.

After a single iteration (in which data from all rows of a block stored in memory 2 are processed by analyzer 6 to write a partially transformed block into memory 4, and data from all columns of the partially transformed block are then processed by analyzer 8 to write a transformed data block back into memory 2), memory 2 contains a set of four interleaved component image blocks, which together define a pyramidal representation of the original image.

Where $M=N$, and M is divisible by $2^k$, the component image blocks are "interleaved" in the sense that, the transformed data in memory 2 consist of a repeating pattern of $2^k \times 2^k$ blocks after each iteration. Typically, multiple iterations are performed ($k=1$ during the first iteration, and is incremented by one before each subsequent iteration). In the case that $M=N$ (where M is divisible by $2^k$), after the first iteration, the interleaved component image blocks in memory 2 consist of a repeating pattern of 2 word $\times$ 2 word blocks, each $2 \times 2$ block consisting of a word from a first (low spatial frequency) component image block and one word each from a second, third, and fourth component image block, where the second, third, and fourth component image blocks represent higher spatial frequency information regarding horizontal image features, vertical image features, and diagonal image features, respectively. At the end of the "kth" iteration, the first memory array (memory 2) contains a pyramidal representation of the input image defined by a repeating pattern of $2^k \times 2^k$ blocks, each $2^k \times 2^k$ block consisting of interleaved words (when its words are considered sequentially in line-scan format) from a number of component image blocks (corresponding to different spatial frequencies).

In preferred embodiments in which $M=N=16$, the FIG. 2 apparatus can perform a three-iteration transformation on each $16 \times 16$ word image data block (such as block 30 shown in FIG. 3) of an image signal, to generate a transformed data block (such as block 42 shown in FIG. 3) of an output signal which is a pyramidal representation of the image signal. Each such transformed data block consists of four, $8 \times 8$ word, interleaved data blocks (e.g., blocks 42A, 42B, 42C, and 42D shown in FIG. 3). Each interleaved $8 \times 8$ data block (e.g., block 42B of FIG. 3) is in form suitable for efficient processing in conventional JPEG or MPEG coding circuitry. In some preferred embodiments, each word of each $8 \times 8$ block comprises 12 bits. In alternative embodiments, each such word can comprise another number of bits (e.g., 8 or 32 bits).

Next, an example of a three-iteration transformation implemented by an embodiment of the FIG. 2 apparatus in which $M=N=16$ (and memory 2 and memory 4 each have at least 256-word capacity), will be described with reference to FIG. 3. The first step in this transformation is to load input image block 30 (comprising $16 \times 16 = 256$ data words) into memory 2. Typically, image block 30 is a portion of a digital image data stream.

The first iteration includes the following steps. For each 16-word row vector $x_i$ of block 30, filter 10 outputs vector $\phi_m$ (of the above-described type, where $0 \leq m \leq 15$). Similarly, for each row vector $x_i$, filter 12 outputs vector $\psi_m$ (of the above-described type, where $0 \leq m \leq 15$). Each pair of vectors $\phi_m$ and $\psi_m$ together determines an orthogonal representation of row vector $x_i$ from memory 2.

Interleaver 14 interleaves the words of each vector $\phi_m$ with the words of the corresponding vector $\psi_m$, to generate a sixteen-word interleaved row vector which is written into a row of memory array 4. When filters 10 and 12 and interleaver 14 have processed all sixteen of the row vectors $x_i$ of block 30, and have caused the processed and interleaved data to be written into memory 4, memory 4 contains partially transformed $16 \times 16$ word block 32. This block consists of data $\phi^1$ and data $\psi^1$ indicated in FIG. 3.

Analyzer 8 then sequentially processes each sixteen-word column $y_i$ of block 32 by converting each column into two eight-word vectors $\phi$ and $\psi$, interleaving the vectors $\phi$ and $\psi$, and writing the resulting sixteen-word transformed (and interleaved) column vector into a column of memory 2. Specifically, for each odd-numbered column of block 32 (e.g., the first column), filter 16 of analyzer 8 outputs an eight-word vector $\phi\phi$ and filter 18 of analyzer 8 outputs an eight-word vector $\phi\psi$. For each even-numbered column of block 32 (e.g., the second column), filter 16 outputs eight-word vector $\psi\phi$ and filter 18 outputs an eight-word vector $\psi\psi$. In FIG. 3, vectors $\phi\phi$, $\phi\psi$, $\psi\phi$, and $\psi\psi$, are denoted respectively as $\phi^1$, $\psi^{1v}$, $\psi^{1h}$, and $\psi^{1d}$. Vectors $\phi^1$ represent relatively low spatial frequency data, and vectors $\psi^{1v}$, $\psi^{1h}$, and $\psi^{1d}$ represent relatively high spatial frequency data.

Interleaver 20 interleaves the words of each vector $\phi^1$ with the words of the corresponding vector $\psi^{1v}$ to generate an interleaved column vector, and interleaver 20 interleaves the words of each vector $\psi^{1h}$ with the words of the corresponding vector $\psi^{1d}$ to generate an interleaved column vector. After all the interleaved column vectors have been sequentially written into different columns of memory 2, the content of memory 2 is first transformed block 34.

Block 34 consists of sixty-four transformed data blocks, each consisting of $2 \times 2$ words, which together define a pyramidal representation of original image data 30. The transformed data blocks are stored in memory 2 as a repeating pattern of $2 \times 1$ word blocks, each $2 \times 2$ block consisting of a word representing low spatial frequency data and three words representing high spatial frequency data.

With reference again to FIG. 3, the second iteration of the transformation generates second transformed block 38 from first transformed block 34. During this second iteration, filters 10 and 12 are caused by timing and control circuitry 24 to receive and process only odd-numbered words from odd-numbered rows of block 34 (e.g., filter 10 processes the first, third, fifth, seventh, ninth, eleventh, thirteenth, and fifteenth words of the first row of block 34, but none of the words of the second row of block 34). For each of the 8-word row vectors $x_i$ written to filter 10 from an odd row of block 34, filter 10 outputs a four-word vector $\phi^2_m$ (of the above-described type, where $0 \leq m \leq 7$). Similarly, for each of the same 8-word row vectors $x_i$ from block 34, filter 12 outputs a four-word vector $\psi^2_m$ (of the above-described type, where $0 \leq m \leq 7$).

Interleaver 14 interleaves the words of each vector $\phi^2_m$ with the words of the corresponding vector $\psi^2_m$, to generate an eight-word interleaved row vector which is written into the odd-numbered word locations of a row of memory array 4. When filters 10 and 12 and interleaver 14 have processed all eight such row vectors $x_i$ of block 34, and have caused the resulting processed and interleaved data to be written into memory 4, memory 4 contains partially transformed 16×16 word block 36.

Analyzer 8 then sequentially processes only the odd-numbered words of the odd-numbered columns of block 36 (under control of timing and control circuitry 24), to generate block 38. Specifically, for each 8-word column vector $y_i$ written from the first (or fifth, ninth, or thirteenth) column of block 36, filter 16 outputs a four-word vector $\phi^2$ and filter 18 of analyzer 8 outputs a four-word vector $\psi^{2v}$. For each 8-word column vector $y_i$ written from the third (or seventh, eleventh, or fifteenth) column of block 36, filter 16 outputs a four-word vector $\phi^{2h}$ and filter 18 outputs a four-word vector $\psi^{2d}$. Vectors $\phi^2$ represent relatively low spatial frequency data, and vectors $\psi^{2v}$, $\psi^{2h}$, and $\psi^{2d}$ represent relatively high 2d spatial frequency data.

Interleaver 20 interleaves the words of each vector $\phi^2$ with the words of the corresponding vector $\psi^{2v}$ to generate an interleaved column vector, and interleaver 20 interleaves the words of each vector $\psi^{2h}$ with the words of the corresponding vector $\psi^{2d}$ to generate an interleaved column vector. After all the interleaved column vectors have been sequentially written into different columns of memory 2, the content of memory 2 is second transformed block 38.

Block 38 consists of sixteen transformed data blocks, each consisting of 4×4 words, which together define a pyramidal representation of original image data 30. The transformed data blocks are stored in memory 2 as a repeating pattern of 4×4 word blocks, each 4×4 block consisting of one word (from a vector $\psi^2$) representing low spatial frequency data, and fifteen words representing higher spatial frequency data.

Still with reference again to FIG. 3, the third (final) iteration of the transformation generates third transformed block 42 from second transformed block 38. During the third iteration, filters 10 and 12 are caused by timing and control circuitry 24 to receive and process only every fourth word from every fourth row of block 38 (e.g., filter 10 processes the first, fifth, ninth, and thirteenth words of the first row of block 38, but none of the words of the second, third, and fourth rows of block 38). For each of the four-word row vectors $x_i$ written to filter 10 from a row of block 38, filter 10 outputs a two-word vector $\phi^3_m$ (of the above-described type, where $0 \leq m \leq 3$). Similarly, for each of the same four-word row vectors $x_i$ from block 38, filter 12 outputs a four-word vector $\psi^3_m$ (of the above-described type, where $0 \leq m \leq 3$).

Interleaver 14 interleaves the words of each vector $\phi^3_m$ with the words of the corresponding vector $\psi^3_m$, to generate a four-word interleaved row vector whose words are written into every fourth word location of the first (or fifth, ninth, or thirteenth) row of memory array 4. When filters 10 and 12 and interleaver 14 have processed all four such row vectors $x_i$ of block 38, and have caused the resulting processed and interleaved data to be written into memory 4, memory 4 contains partially transformed 16×16 word block 40.

Analyzer 8 then sequentially processes only every fourth word of every fourth column of block 40, to generate block 42. Specifically, for each four-word column vector $y_i$ written from the first (or ninth) column of block 40, filter 16 outputs a two-word vector $\phi^3$ and filter 18 of analyzer 8 outputs a two-word vector $\psi^{3v}$. For each four-word column vector $y_i$ written from the seventh (or fifteenth) column of block 40, filter 16 outputs a two-word vector $\phi^{3h}$ and filter 18 outputs a two-word vector $\psi^{3d}$. Vectors $\phi^3$ represent relatively low spatial frequency data, and vectors $\psi^{3v}$, $\psi^{3h}$, and $\psi^{3d}$ represent relatively high spatial frequency data.

Interleaver 20 interleaves the words of each vector $\phi^3$ with the words of the corresponding vector $\psi^{3v}$ to generate an interleaved column vector, and interleaver 20 interleaves the words of each vector $\psi^{3h}$ with the words of the corresponding vector $\psi^{3d}$ to generate an interleaved column vector. After all the interleaved column vectors have been sequentially written into different columns of memory 2, the content of memory 2 is third transformed block 42.

Block 42 consists of four transformed data blocks, each consisting of 8×8 words, which together define a pyramidal representation of original image data 30. The transformed data blocks are stored in memory 2 as a repeating pattern of four 8×8 word blocks, where each 8×8 block consists of one word (from a vector $\phi^3$) representing lowest spatial frequency data, and sixty-three words representing data having higher spatial frequency.

Figure 3:
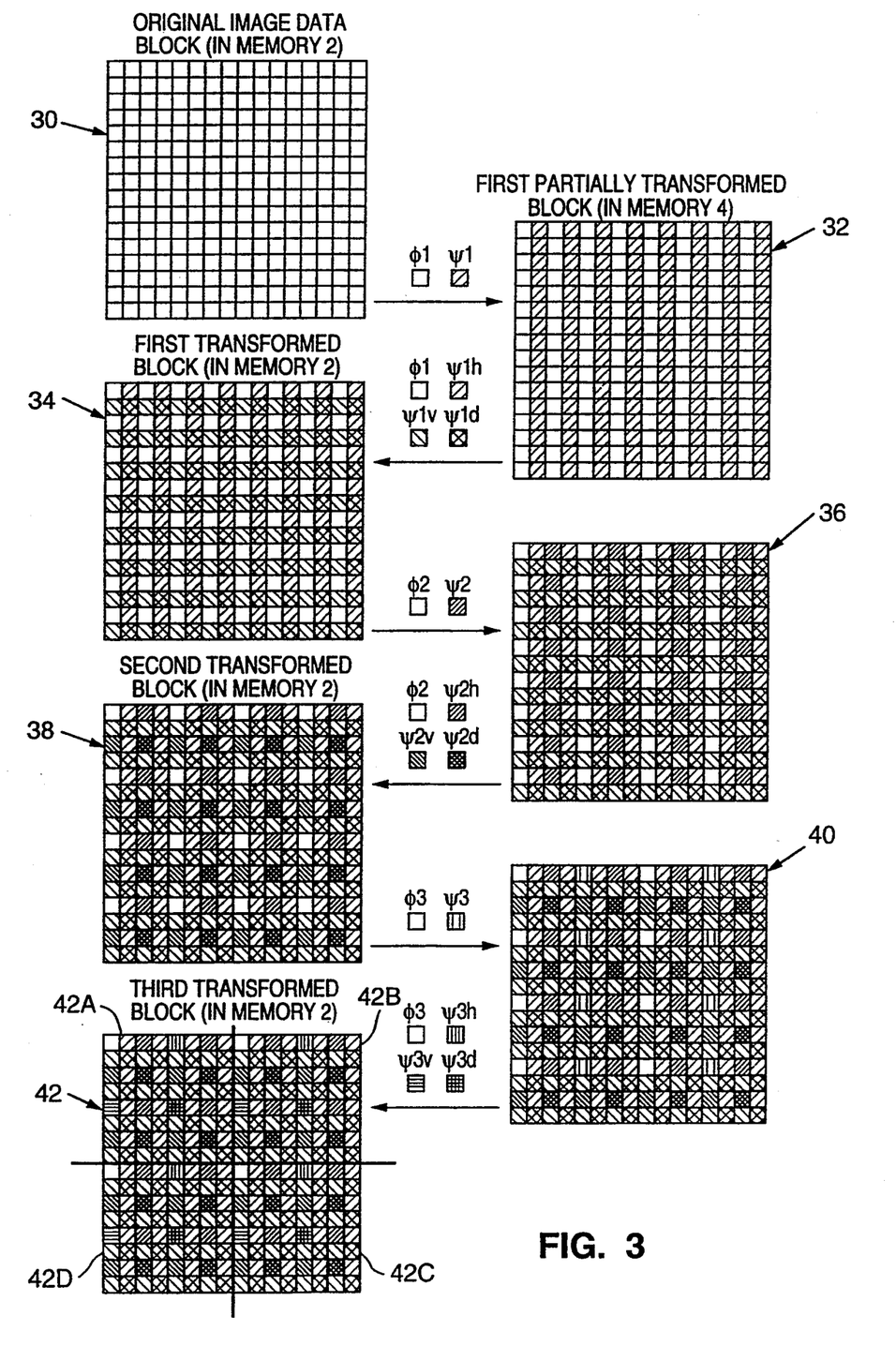
FIG. 3 is a diagram representing a six-step transformation of an image signal in accordance with the invention, to generate an output signal which is a pyramidal representation of the image signal.
Figure 4:
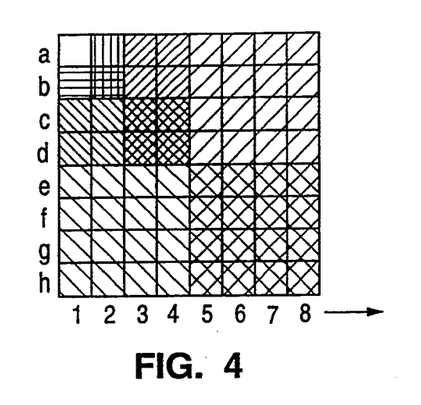
FIG. 4 is a diagram of the output signal of FIG. 3 with its component signals reordered according to spatial frequency.

FIG. 4 represents a reordered version of block 42A (or 42B, 42C, or 42D) of FIG. 3. In FIG. 4, the data word having index pair "a1" (the word in the upper left corner) represents the lowest spatial frequency features of the image, the words having index pairs b2, c3, c4, d3, d4, e5–e8, f5–f8, g5–g8, and h5–h8 represent higher spatial frequency image features along a diagonal axis, the words having index pairs a2–a4, b3, b4, a5–a8, b5–b8, c5–c8, and d5–d8 represent higher spatial frequency image features along a horizontal axis, and the words having index pairs b1, c1, c2, d1, d2, e1–e4, f1–f4, g1–g4, and h1–h4 represent higher spatial frequency image features along a vertical axis. Of the "diagonal" data words, the word b2 represents image data having lowest spatial frequency, the words c3, c4, d3, and d4 represent data having higher spatial frequency, and the words having index pairs e5–e8, f5–f8, g5–g8, and h5–h8 represent data having highest spatial frequency. Of the "vertical" data words, the word b1 represents image data having lowest spatial frequency, the words c1, c2, d1, and d2 represent image data having higher spatial frequency, and the words having index pairs e1–e4, f1–f4, g1–g4, and h1–h4 represent data having highest spatial frequency.

It is apparent from a comparison of FIG. 4 with block 42A of FIG. 3, that the FIG. 4 data order is much more uniform (in terms of spatial frequency) than the data order of block 42A. This can be understood by realizing that, if the FIG. 4 data are read (or written) in line-scan order, strings of words representing identical spatial frequency (e.g., four-word string a5 through a8, and eight-word string d5 through e4) will be read (or written) consecutively. In contrast, if block 42A is read (or written) in line-scan order, no more than two words of identical spatial frequency (e.g., the eighth word in the first line followed by the first word in the second line)

will be read (or written) consecutively. Because the data of block 42A are much ordered less uniformly in terms of spatial frequency than are the FIG. 4 data, the data of block 42A are in better form for subsequent coding by conventional hardware in accordance with the conventional JPEG or MPEG compression algorithm. Indeed, block 42 is in optimal form for subsequent coding by such conventional JPEG or MPEG compression circuitry.

Figure 5:
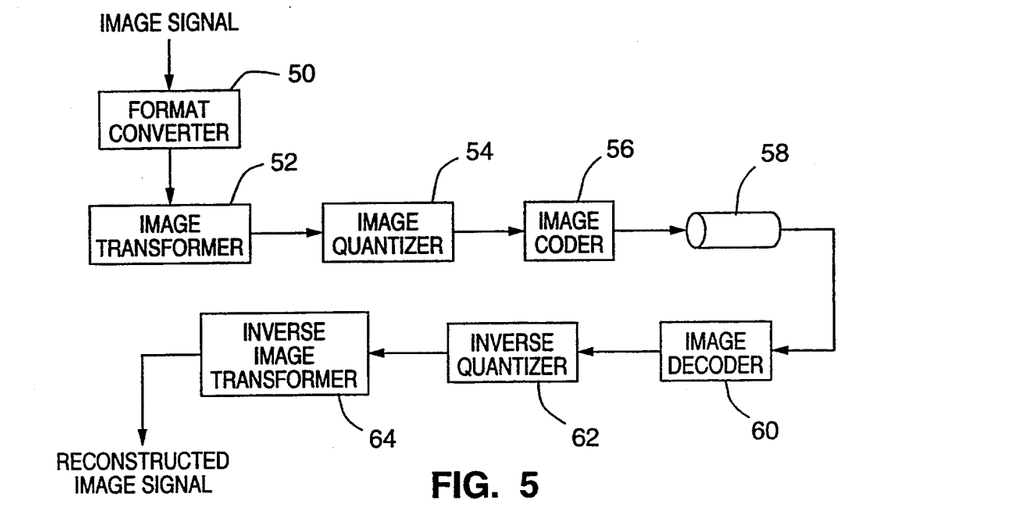
FIG. 5 is a block diagram of an image compression and transmission (or storage) system which embodies the invention.

FIG. 5 is a block diagram of a preferred embodiment of the invention. Format conversion circuit 50 of the system shown in FIG. 5 receives an image signal (which can be color video signal from a camera), and transforms the image signal into a format suitable for processing in image transformation circuit 52. For example, circuit 50 can be conventional circuitry for receiving a color video signal in color raster scan format, and reformatting it into a stream of N×M image data blocks, each block consisting of digital words in line-scan format.

Image transformation circuit 52 performs the above-described iterative transformation on each N×M image data block received from circuit 50. Thus, for each image data block, circuit 52 outputs a set of interleaved component image blocks, which together define a pyramidal representation of the image data block. In preferred embodiments, M=N=16, and circuit 50 performs a three-iteration transformation on each 16–16 image data block to convert the block into a transformed block having the format of block 42 of FIG. 3. Typically in such embodiments, each 16×16 block received by circuit 52 represents a very small portion of an image, and thus the difference between each pair of corresponding lowest frequency (DC) components of consecutive transformed blocks output from circuit 52 (i.e., the difference between corresponding words from corresponding vectors $\phi^3$ in consecutive transformed blocks) is typically small. For example, the difference between the upper left word of block 42B in FIG. 3, and the upper left word of the next block 42B output from circuit 52 (block 42B in the next block 42 output from circuit 52) is typically very small.

All words of the transformed data output from circuit 52 are quantized in quantizer circuit 54, except (typically) the words representing lowest frequency (DC) components. The quantization process reduces the magnitude (or number of bits) of each quantized word. The quantized words output from circuit 54 include more zero-value words than the corresponding unquantized words input to circuit 54. Typically, a single quantizer is applied to all the words within a particular sub-image (i.e., to all words representing one of the above-described vectors, such as vector $\psi^{3d}$, $\psi^{2h}$, or $\psi^{2v}$), although unique quantizers can be applied to all words to be quantized (e.g., to all sixty-four words, except the word representing vector $\phi^3$, of a block 42B received from circuit 52).

Each block of quantized data that is output from circuit 54 is received by image coding circuit 56, and undergoes coding therein, for example to generate compressed image data representing a compressed version of the corresponding image block previously output from circuit 50. Coding circuit 56 can consist of conventional hardware for performing the conventional JPEG or MPEG compression algorithm on each 8×8 word block of quantized data output from circuit 54. Where circuit 56 is such a conventional JPEG or MPEG compression circuit, the embodiment of the FIG. 7 circuit described below with reference to FIG. 3 is preferably employed to implement circuit 52, although the FIG. 2 apparatus can alternatively be employed for this purpose. An implementation of the FIG. 7 (or FIG. 2) apparatus which generates interleaved component blocks having the form of block 42 in FIG. 3 is desirable for use as image transformation circuit 52 with JPEG or MPEG compression hardware because it generates 8×8 blocks of transformed data (e.g., block 42B of FIG. 3), and because such 8×8 blocks of transformed data are in a form optimal for processing by conventional JPEG or MPEG compression circuitry since the words of each such 8×8 block are ordered nonuniformly in terms of spatial frequency.

Figure 6:
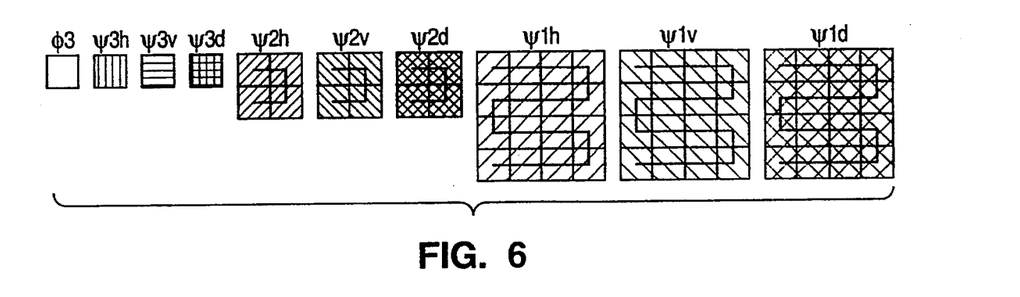
FIG. 6 is a diagram of a sequence in which the coefficients of each 8×8 block 42A, 42B, 42C, and 42D (shown in FIG. 3) are typically reordered by coding circuit 56 (of FIG. 5) to implement coding in an efficient manner.

FIG. 6 is a diagram of a sequence in which the words (coefficients) of each 8×8 block 42A, 42B, 42C, and 42D of FIG. 3 are typically reordered by coding circuit 56, to implement coding efficiently. As indicated in FIG. 6, coding circuit 56 typically codes the DC coefficient (labeled $\phi^3$) first, then the $\psi^{3h}$ coefficient, then the $\psi^{3v}$ coefficient, then the $\psi^{3d}$ coefficient, then the four $\psi^{2h}$ coefficients, then the four $\psi^{2v}$ coefficients, then the four $\psi^{2d}$ coefficients, then the sixteen $\psi^{1h}$ coefficients, then the sixteen $\psi^{1v}$ coefficients, and finally the sixteen $\psi^{1d}$ coefficients.

In typical cases where (as explained above) the difference between each pair of corresponding lowest spatial frequency (DC) components of consecutive transformed blocks output from circuit 52 is small, coding circuit 56 will exploit this property by coding the DC components using a conventional differential pulse code modulation (DPCM) technique. Such a DPCM technique codes the difference between the DC coefficient of the current block and the corresponding DC coefficient of the previous block.

Also due to the typically small size of each block received by circuit 52 (in relation to the size of a full image represented by the input image signal), the higher spatial frequency (non-DC) components of the transformed blocks output from circuit 52 are typically highly redundant and (after quantization) usually contain runs of consecutive zeros. Coding circuit 56 can exploit these properties by coding the non-DC components using a conventional run-length technique in which the upper four bits of the code symbol indicate the number of consecutive zeros before the next non-zero word, and the lower four bits of the code symbol indicate the number of significant bits in the next word.

The block codes from the DPCM and run-length models can be further compressed using entropy encoding, in preferred embodiments of coding circuit 56. Such entropy encoding is conventionally implemented using a Huffman coding circuit. To compress data symbols, a Huffman coder creates shorter codes for frequently occurring symbols and longer codes for infrequently occurring symbols.

The coded data stream output from circuit 56 (typically a stream of compressed data) is transmitted through (or stored within) transmission or storage means 58, and then received (or read from storage) by image decoder circuit 60.

Image decoder circuit 60 performs the inverse operations to those performed by circuit 56, to decode the received data. Inverse quantizer circuit 62 performs the inverse operations to those performed by circuit 52, to dequantize the decoded data output from circuit 60.

Inverse image transformation circuit 64 performs (recursively) the inverse operations performed by circuit 52. In a preferred embodiment, circuit 64 has the same structure does circuit 52 except that each filter of circuit 64's analyzers (e.g., filters 10, 12, 16, and 18) generates an "inverse" set of coefficients to the coefficients generated by the corresponding filter of circuit 52. Each N×M image data block output from circuit 64 is a reconstructed version of a corresponding N×M image data block received by circuit 52.

Figure 7:
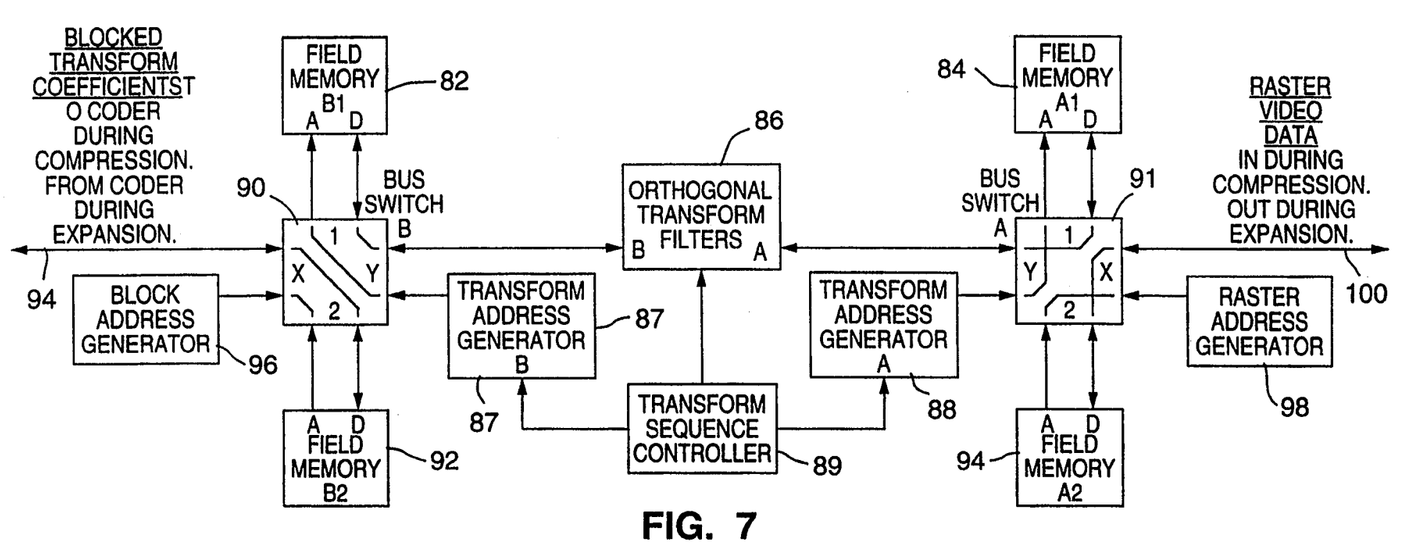
FIG. 7 is a block diagram of a second preferred embodiment of the inventive apparatus (which is preferably employed, as a substitute for the FIG. 3 apparatus, to implement either or both of image transformation circuit 52 and inverse image transformation circuit 64 of the FIG. 5 system).

In preferred embodiments, such as that shown in FIG. 7, the apparatus of the invention includes only one analyzer connected between first and second memories (i.e., analyzer 86 of FIG. 7) and a control means. The control means controls the analyzer to cause it to perform not only the operations performed by the first analyzer (in those embodiments of the invention which employ two analyzers) but also those performed by the second analyzer (in embodiments with two analyzers). In the FIG. 7 apparatus, the control means includes transform address generators 87 and 88, each of which provides appropriate addresses for writing vectors of data from one of memories 82, 84, 92, and 94 to analyzer 86 (or for reading interleaved vectors from analyzer 86 to one of memories 82, 84, 92, and 94), and transform sequence controller 89 for controlling transform address generators 87 and 88.

The FIG. 7 embodiment is designed to increase the rate at which the inventive apparatus can process data (relative to the FIG. 2 embodiment), and to permit processing of video images in real time at a rate of 60 fields per second. The FIG. 7 apparatus includes identical video field memories 82, 84, 92, and 94, quad port bus switches 90 and 91, and analyzer circuit 86 connected between switches 90 and 91. Each of memories 82, 84, 92, and 94 has capacity to store an N×M field of video data (a data block having N rows and M columns). Typically, M is equal to 640 and N is equal to 480.

Switch 90 has two positions: one connecting block address generator 96 and data bus 99 to memory 92 and analyzer 86 and address generator 87 to memory 82; and the other connecting block address generator 96 and data bus 99 to memory 82 and analyzer 86 and address generator 87 to memory 92. Switch 91 also has two positions: one connecting raster address generator 98 and data bus 100 to memory 94 and analyzer 86 and address generator 88 to memory 84; and the other connecting raster address generator 98 and data bus 100 to memory 84 and analyzer 86 and address generator 88 to memory 94.

Switches 90 and 91 are controlled so that, at any time, three operations are simultaneously performed: first, analyzer 86 reads and writes data between a first one of the memories (memory 82 or 92) and a second one of the memories (memory 84 or 94) to implement the inventive transformation on an N×M field of data stored in the first or second memory; second, a previously transformed N×M field of data is read out of a third one of the memories; and third, a new N×M field of data is written into the fourth one of the memories.

Analyzer 86 preferably includes a pair of transform filters (such as filters 10 and 12 of FIG. 2) and an interleaving circuit (such as interleaving circuit 14 of FIG. 2). Under control of transform sequence controller 89, analyzer 86 can receive a pixel stream (i.e., can sequentially receive the words of a data vector) at either of its ports (A and B) from either one of switches 90 and 91. At times when analyzer 86 receives a pixel stream from switch 90, each of its filters processes the stream and supplies a transformed vector to the interleaving circuit, and the interleaving circuit outputs an interleaved data stream to switch 91. At times when analyzer 86 receives a pixel stream from switch 91, each of its filters processes the stream and supplies a transformed vector to the interleaving circuit, and the interleaving circuit outputs an interleaved data stream to switch 90.

Transform address generator 87, under control of transform sequence controller 89, provides appropriate addresses through switch 90 to memory 82 (or 92) for writing vectors of data from that memory to analyzer 86, or for reading interleaved vectors from analyzer 86 to that memory. Transform address generator 88, under control of transform sequence controller 89, provides appropriate addresses through switch 91 to memory 84 (or 94) for writing vectors of data from that memory to analyzer 86, or for reading interleaved vectors from analyzer 86 to that memory. Transform sequence controller 89 not only controls analyzer 86 (in the manner described above) but also transform address generators 87 and 88.

During a data compression mode, the FIG. 7 apparatus receives a stream of uncompressed image data on bus 100, and outputs a stream of transformed uncompressed data on bus 99 for subsequent compression (typically, by quantization and coding). During a data expansion mode, the FIG. 7 apparatus receives a stream of compressed image data on bus 99, and outputs a stream of inversely-transformed compressed data on bus 100 for subsequent expansion.

Raster address generator 98 provides the addresses required to write a field of uncompressed video data (received, in line-scan format, from data bus 100) to memory 84 or 94 (during a data compression mode), and to read a field of video data (in line-scan format) from memory 84 or 94 (during a data expansion mode).

Block address generator 96 provides the addresses required to write interleaved blocks of compressed video data (received on bus 99) to memory 82 or 92 (during a data expansion mode), and to read a field of uncompressed video data (in line-scan format) from memory 84 or 94 (during a data compression mode).

Next, we describe (with reference to FIG. 8) the sequence in which the FIG. 7 apparatus processes data in a data compression mode. For specificity, FIG. 8 assumes that three iterations of the inventive recursive transformation process are performed by analyzer 86 on each field of data to be transformed (one iteration comprises three passes through an analyzer and the other two each comprise two passes through the analyzer). In alternative embodiments, more than three or less than three iterations can be performed on the data comprising each field.

Figure 8:
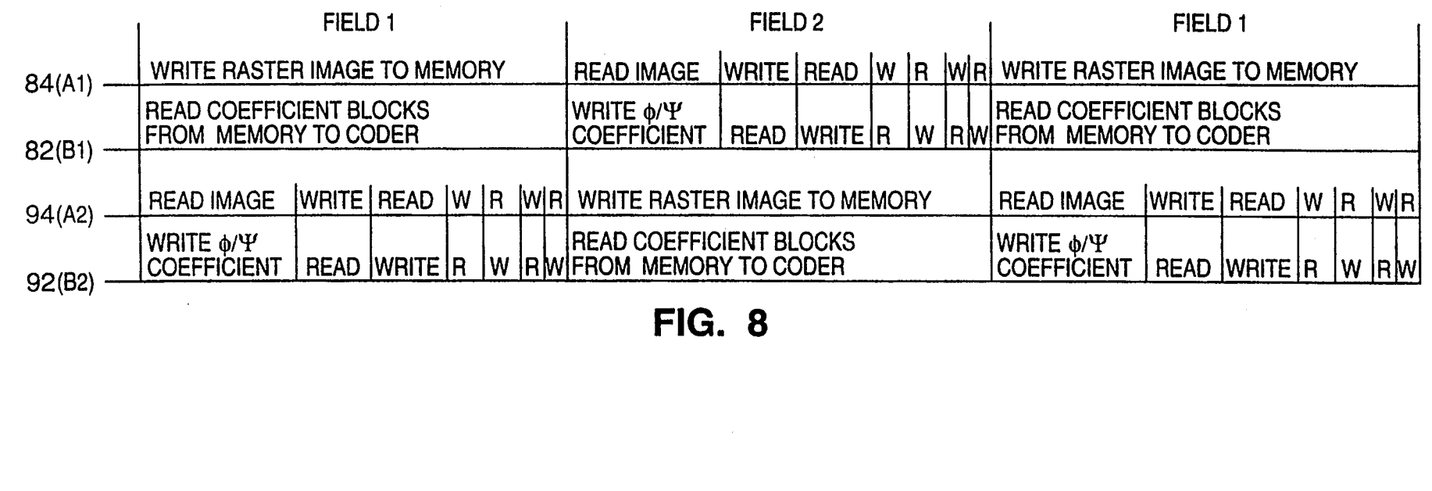
FIG. 8 is a diagram representing the sequence in which the FIG. 7 apparatus processes data in the data compression mode.

During the period labeled "field 1" in FIG. 8, a first N×M field of video data is written from line 100 through switch 91 into memory 84 in line-scan format (under control of raster address generator 98), and simultaneously, a second (previously transformed) N×M field of data in memory 82 is read (typically on an 8×8 block by 8×8 block basis, when N=640 and M=480) under control of block address generator 96 from memory 82 through switch 90 to bus 99. During the same period, a third field of video data stored in memory 94 undergoes three iterations of the inventive recursive transformation process. This recursive (three-iteration) process includes the following sequence of steps:

during the first iteration (which comprises three passes through analyzer 86), the N×M data field in memory 94 is read (under control of address generator 88 and controller 89), processed in analyzer 86, and the processed (transformed and interleaved) data are written from analyzer 86 through switch 90 to memory 92. Then, half of the processed N×M data field in memory 92 is read (i.e., M vertical vectors in memory 92, each comprising N/2 words, are read) under control of address generator 87 and controller 89, processed in analyzer 86, and the processed (transformed and interleaved) data are written from analyzer 86 through switch 91 back to memory 94. Then, the same N/2×M block of data just processed in analyzer 86 is read from memory 94 (i.e., N/2 horizontal vectors in memory 94, each comprising M words, are read from memory 94) under control of address generator 88 and controller 89, processed in analyzer 86, and the resulting processed (transformed and interleaved) data are written from analyzer 86 through switch 90 back to memory 92 under control of address generator 87 and controller 89;

then, during the second iteration, a subset of the N×M data block in memory 92 are read (under control of address generator 87 and controller 89) to analyzer 86 for processing, and the resulting processed (transformed and interleaved) data are written from analyzer 86 through switch 91 to a subset of the memory locations of memory 94 under control of address generator 88 and controller 89, and data from a subset of the memory locations of memory 94 are then read (under control of address generator 88 and controller 89) to analyzer 86 for processing, and the resulting processed (transformed and interleaved) data are written from analyzer 86 through switch 90 back to memory 92 under control of address generator 87 and controller 89; and finally, during the third iteration, a smaller subset of the data in memory 92 are read (under control of address generator 87 and controller 89) to analyzer 86 for processing, and the resulting processed (transformed and interleaved) data are written from analyzer 86 through switch 91 to a smaller subset of the memory locations of memory 94 under control of address generator 88 and controller 89, and data from a smaller subset of the memory locations of memory 94 are then read (under control of address generator 88 and controller 89) to analyzer 86 for processing, and the resulting processed (transformed and interleaved) data are written from analyzer 86 through switch 90 back to memory 92 under control of address generator 87 and controller 89.

At the end of the period labeled "field 1" in FIG. 8, quad port switches 90 and 91 are reversed.

Then, during the period labeled "field 2" in FIG. 8, the next field is written from bus 100 into memory 94 while the previously transformed field of data in memory 92 is read (block by block) under control of block address generator 96 from memory 92 through switch 90 to bus 99. During the same period, the field of video data previously written into memory 84 undergoes three iterations of the inventive recursive transformation process. This process is performed in the same way as was the recursive transformation performed during the period labeled "field 1," except that data are written and read between memories 84 and 82 (rather than memories 94 and 92). At the end of the third iteration, the entire contents of memory 84 are written into memory 82. Then, at the end of the period labeled "field 2" in FIG. 8, quad port switches 90 and 91 are again reversed.

Then, during the period labeled "field 3" in FIG. 8, the same steps performed during the period labeled "field 1" are repeated.

The sequence in which the FIG. 7 apparatus processes data in a data expansion mode is identical to that described with reference to FIG. 8, except in that the roles of memories 84 and 82 are reversed and the roles of memories 94 and 92 are reversed, and in that data flow is from bus 99 to bus 100 (rather than from bus 100 to bus 99 as in the compression mode).

It should be apparent that the terms "horizontal" and "vertical" used in the specification, including in the claims, do not refer to any physical orientation of memory locations in a memory array. The term "memory array" implies memory locations organized in a coordinate system having at least two dimensions, so that each location is identified by a set of two or more coordinates. The term "horizontal" refers to a first coordinate in such set, and the term "vertical" refers to a second coordinate in such set. Thus, "horizontal" vector and "row" denote the contents of a set of memory locations having different first coordinates and a common second coordinate, and "vertical" vector and "column" denote the contents of a set of memory locations having different second coordinates and a common first coordinate.

Various modifications in the structure and method of operation of the described embodiments are within the scope and spirit of this invention, and will be apparent to those skilled in the art. Although the invention has been described in connection with specific preferred embodiments, the invention as claimed should not be unduly limited to such specific embodiments.

What is claimed is:

1. An apparatus for transforming input image data, including:

first memory means having at least N rows and M columns of memory locations, where N and M are integers divisible by $2^K$ where K is a positive integer;

second memory means having at least N rows and M columns of memory locations;

analyzer means connected between the first memory means and the second memory means, including means for receiving horizontal vectors of data stored in the first memory means, transforming each of the horizontal vectors into an interleaved orthogonal representation thereof, writing each said interleaved orthogonal representation into a different row of the second memory means, receiving vertical vectors of data stored in the second memory means, transforming each of the vertical vectors into a second interleaved orthogonal representation thereof, and writing each said second interleaved orthogonal representation into a different column of the first memory means, wherein each said interleaved orthogonal representation consists of interleaved portions of one of the horizontal vectors received from the first memory means, and each said second interleaved orthogonal representation consists of interleaved portions of one of the vertical vectors received from the second memory means; and control means for controlling the analyzer means to implement K transformation iterations, each of said iterations including transformation by the analyzer means of a set of horizontal vectors of data stored in the first memory means followed by further transformation by the analyzer means of a set of vertical vectors of data stored in the second memory means.

2. The apparatus of claim 1, wherein the analyzer means includes:
   a wavelet transform module including a first pair of conjugate mirror filters, and a first interleaving circuit connected to outputs of the mirror filters, and
   wherein the control means controls the wavelet transform module to operate in a selected one of a first mode in which inputs of the mirror filters are connected to the first memory means and an output of the interleaving circuit is connected to the second memory means, and a second mode in which the inputs of the mirror filters are connected to the second memory means and the output of the interleaving circuit is connected to the first memory means.

3. The apparatus of claim 2, wherein the first memory means includes a first memory having at least N rows and M columns of memory locations and a second memory having at least N rows and M columns of memory locations, wherein the second memory means includes a third memory having at least N rows and M columns of memory locations and a fourth memory having at least N rows and M columns of memory locations, and also including:
   switching means connecting the wavelet transform module with the first memory means and the second memory means, the switching means having a first state connecting the wavelet transform module between the first memory and the third memory, and a second state connecting the wavelet transform module between the second memory and the fourth memory.

4. The apparatus of claim 1, wherein the analyzer means includes:
   a first wavelet transform module including a first pair of conjugate mirror filters and a first interleaving circuit connected to outputs of the first pair of conjugate mirror filters, wherein inputs of the first pair of mirror filters are connected to the first memory means and an output of the first interleaving circuit is connected to the second memory means; and
   a second wavelet transform module including a second pair of conjugate mirror filters and a second interleaving circuit connected to outputs of the second pair of conjugate mirror filters, wherein inputs of the second pair of conjugate mirror filters are connected to the second memory means and an output of the second interleaving circuit is connected to the first memory means.

5. The apparatus of claim 1, wherein the first memory means contains an N×M image data block at commencement of a first one of the transformation iterations, and wherein the control means controls the analyzer means so that, following a Kth one of the transformation iterations, the first memory means contains a set of interleaved component image blocks defining a pyramidal representation of the image data block arranged in a repeating pattern of $2^K \times 2^K$ blocks, each of said $2^K \times 2^K$ blocks consisting of interleaved words from different component image blocks.

6. The apparatus of claim 1, wherein N=M.

7. The apparatus of claim 6, wherein M=16.

8. An apparatus for transforming input image data, including:
   a first memory having at least N rows and M columns of memory locations, where N and M are integers;
   a second memory having at least N rows and M columns of memory locations;
   a first analyzer connected between the first memory and the second memory, including means for receiving horizontal vectors of data stored in the first memory, transforming each of the horizontal vectors into an interleaved orthogonal representation thereof, and writing each said interleaved orthogonal representation into a different row of the second memory; and
   a second analyzer connected between the first memory and the second memory, including means for receiving vertical vectors of data stored in the second memory after each said interleaved orthogonal representation has been written into said second memory, transforming each of the vertical vectors into a second interleaved orthogonal representation thereof, and writing each said second interleaved orthogonal representation into a different column of the first memory, wherein each said interleaved orthogonal representation consists of interleaved portions of one of the horizontal vectors received from the first memory, and each said second interleaved orthogonal representation consists of interleaved portions of one of the vertical vectors received from the second memory.

9. The apparatus of claim 8, wherein the first analyzer is a wavelet transform module including a first pair of conjugate mirror filters and a first interleaving circuit, and the second analyzer is a wavelet transform module including a second pair of conjugate mirror filters and a second interleaving circuit.

10. The apparatus of claim 8, wherein each of M and N is divisible by $2^K$, where K is a positive integer, and also including:
    control means for controlling the first analyzer and the second analyzer to implement K transformation iterations, each of said iterations including transformation by the first analyzer of a set of horizontal vectors of data stored in the first memory followed by further transformation by the second analyzer of a set of vertical vectors of data stored in the second memory.

11. The apparatus of claim 10, wherein the first memory contains an N×M image data block at commencement of a first one of the transformation iterations, and wherein the control means controls the first analyzer and the second analyzer so that, following a Kth one of the transformation iterations, the first memory contains a set of interleaved component image blocks defining a pyramidal representation of the image data block arranged in a repeating pattern of $2^K \times 2^K$ blocks, each of said $2^K \times 2^K$ blocks consisting of interleaved words from different component image blocks.

12. The apparatus of claim 8, wherein N=M=16.

13. The apparatus of claim 12, also including:
    control means for controlling the first analyzer and the second analyzer to implement three transformation iterations on a 16×16 word data block stored in the first memory, each of said iterations including transformation of a set of horizontal vectors of data stored in the first memory by the first analyzer followed by further transformation of a set of vertical vectors of data stored in the second memory by the second analyzer.

14. The apparatus of claim 13, wherein the control means controls the first analyzer and the second analyzer so that each of the horizontal vectors and the vertical vectors during a first of the iterations consists of sixteen words, each of the horizontal vectors and the vertical vectors during a second of the iterations consists of eight words, and each of the horizontal vectors and the vertical vectors during a third of the iterations consists of four words.

15. A method for transforming input image data using an apparatus including a first memory having at least N rows and M columns of memory locations, where N and M are integers, and a second memory having at least N rows and M columns of memory locations, said method including the steps of:

(a) receiving horizontal vectors of data stored in the first memory, transforming each of the horizontal vectors into an interleaved orthogonal representation thereof, and writing each said interleaved orthogonal representation into a different row of the second memory; and (b) after step (a), receiving vertical vectors of data stored in the second memory, transforming each of the vertical vectors into a second interleaved orthogonal representation thereof, and writing each said second interleaved orthogonal representation into a different column of the first memory, wherein each said interleaved orthogonal representation consists of interleaved portions of one of the horizontal vectors received from the first memory, and each said second interleaved orthogonal representation consists of interleaved portions of one of the vertical vectors received from the second memory.

16. The method of claim 15, wherein each of M and N is divisible by $2^K$, where K is a positive integer, and also including the step of:

(c) performing K iterations of steps (a) and (b) in such a manner that each of the horizontal vectors consists of $M/2^{K-1}$ words during a Kth one of such iterations, and each of the vertical vectors consists of $N/2^{K-1}$ words during the Kth one of the iterations.

17. The method of claim 16, wherein M=N.

18. The method of claim 17, wherein M=16.

19. The method of claim 17, wherein the first memory contains an M×M image data block upon commencement of the first iteration of step (a), and wherein following a Kth one of the iterations of step (b), the first memory contains a set of interleaved component image blocks defining a pyramidal representation of the image data block arranged in a repeating pattern of $2^K \times 2^K$ blocks, each of said $2^K \times 2^K$ blocks consisting of interleaved words from different component image blocks.

20. A method for transforming input image data using an apparatus including a first memory having at least N rows and M columns of memory locations, where N and M are integers, and a second memory having at least N rows and M columns of memory locations, wherein each of M and N is divisible by $2^K$, and K is a positive integer, said method including the steps of:

(a) loading an N×M image data block into the first memory;

(b) receiving horizontal vectors of the data block stored in the first memory, transforming each of the horizontal vectors into an interleaved orthogonal representation thereof, and writing said interleaved orthogonal representation into a different row of the second memory;

(c) after step (b), receiving vertical vectors of data stored in the second memory, transforming each of the vertical vectors into a second interleaved orthogonal representation thereof, and writing each said second interleaved orthogonal representation into a different column of the first memory, wherein each said interleaved orthogonal representation consists of interleaved portions of one of the horizontal vectors received from the first memory, and each said second interleaved orthogonal representation consists of interleaved portions of one of the vertical vectors received from the second memory;

(d) performing K iterations of steps (b) and (c) in such a manner that each of the horizontal vectors consists of $M/2^{K-1}$ words during a Kth one of such iterations, each of the vertical vectors consists of $N/2^{K-1}$ words during the Kth one of the iterations, and following the Kth one of the iterations of step (c), the first memory contains a set of interleaved component image blocks defining a pyramidal representation of the image data block; and (e) after step (d), loading a second N×M image data block into the first memory, and repeating steps (b) through (d) to process said second N×M image data block.

21. (Amended) A method for compressing input image data, using an apparatus including a first memory having at least N rows and M columns of memory locations, where N and M are integers, and a second memory having at least N rows and M columns of memory locations, said method including the steps of:

(a) loading an N×M image data block into the first memory;

(b) receiving horizontal vectors of the data block stored in the first memory, transforming each of the horizontal vectors into an interleaved orthogonal representation thereof, and writing each said interleaved orthogonal representation into a different row of the second memory;

(c) after step (b), receiving vertical vectors of data stored in the second memory, transforming each of the vertical vectors into a second interleaved orthogonal representation thereof, and writing each said second interleaved orthogonal representation into a different column of the first memory, wherein each said interleaved orthogonal representation consists of interleaved portions of one of the horizontal vectors received from the first memory, and each said second interleaved orthogonal representation consists of interleaved portions of one of the vertical vectors received from the second memory;

(d) performing K iterations of steps (b) and (c) in such a manner that each of the horizontal vectors consists of $M/2^{K-1}$ words during a Kth one of such iterations, each of the vertical vectors consists of $N/2^{K-1}$ words during the Kth one of the iterations, and following the Kth one of the iterations of step (c), the first memory contains a set of interleaved component image blocks defining a pyramidal representation of the image data block; and (e) after step (d), compressing the set of interleaved component image blocks stored in the first memory by performing quantization and coding operations thereon, thereby generating a compressed block of image data.

22. The method of claim 21, also including the step of:
(f) after step (e), decompressing the compressed block of image data by performing an inverse coding operation and then an inverse quantization operation thereon, thereby generating a reconstructed set of interleaved component image blocks.

23. The method of claim 21, wherein M=N.

24. The method of claim 23, wherein M=16.

25. An apparatus for compressing input image data, including:
a first memory means having at least N rows and M columns of memory locations, where N and M are integers, with an N×M image data block stored in the first memory means;
a second memory means having at least N rows and M columns of memory locations;
analyzer means connected between the first memory means and the second memory means, including means for receiving horizontal vectors of data stored in the first memory means, transforming each of the horizontal vectors into an interleaved orthogonal representation thereof, writing each said interleaved orthogonal representation into a different row of the second memory means, receiving vertical vectors of data stored in the second memory means, transforming each of the vertical vectors into a second interleaved orthogonal representation thereof, and writing each said second interleaved orthogonal representation into a different column of the first memory means, wherein each said interleaved orthogonal representation consists of interleaved portions of one of the horizontal vectors received from the first memory means, and each said second interleaved orthogonal representation consists of interleaved portions of one of the vertical vectors received from the second memory means;
control means for controlling the analyzer means to implement K transformation iterations, each of said iterations including transformation by the analyzer means of a set of horizontal vectors of data stored in the first memory means followed by further transformation by the analyzer means of a set of vertical vectors of data stored in the second memory means, wherein following the Kth one of the iterations the first memory means contains a set of interleaved component image blocks defining a pyramidal representation of the image data block; and
means for compressing the set of interleaved component image blocks stored in the first memory means by performing quantization and coding operations thereon, thereby generating a compressed block of image data.

26. The apparatus of claim 25, also including:
means for decompressing the compressed block of image data by performing an inverse coding operation and then an inverse quantization operation thereon, thereby generating a reconstructed set of interleaved component image blocks.

27. The apparatus of claim 25, wherein the control means controls the analyzer means to perform the K transformation iterations in such a manner that following a Kth one of the transformation iterations, the first memory means contains a set of interleaved component image blocks defining a pyramidal representation of the image data block arranged in a repeating pattern of $2^K \times 2^K$ blocks, each of said $2^K \times 2^K$ blocks consisting of interleaved words from different component image blocks.

28. The apparatus of claim 25, wherein the analyzer means is a wavelet transform module including a pair of conjugate mirror filters and an interleaving circuit.

29. The apparatus of claim 25, wherein N=M.

30. The apparatus of claim 29, wherein M=16.

* * * * *